June 19, 1956

W. W. HERRICK 2,751,214

WEIGHING SCALE

Filed Nov. 4, 1952

INVENTOR
William Wilson Herrick
BY
Edwin H. Owen
ATTORNEY

June 19, 1956     W. W. HERRICK     2,751,214
WEIGHING SCALE

Filed Nov. 4, 1952     3 Sheets-Sheet 2

INVENTOR
William Wilson Herrick
BY
ATTORNEY

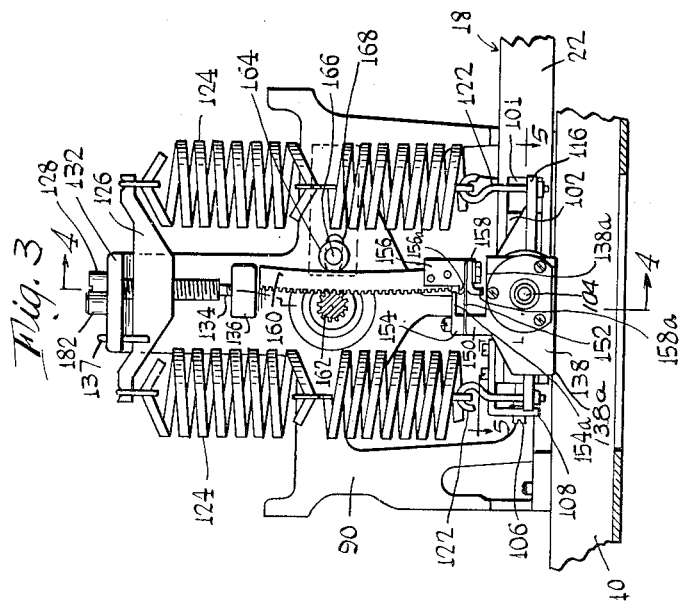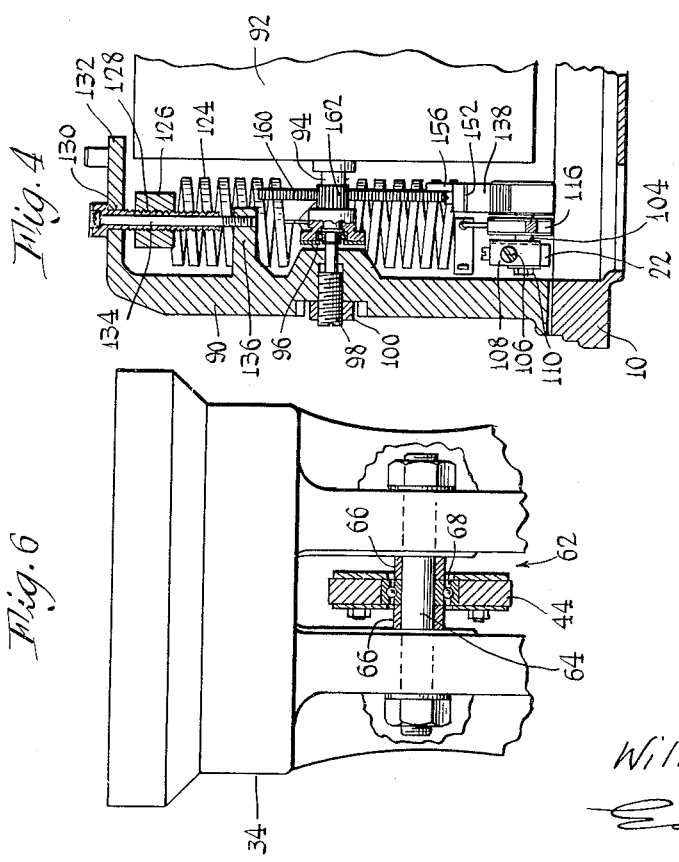

United States Patent Office 2,751,214
Patented June 19, 1956

2,751,214
WEIGHING SCALE

William Wilson Herrick, Stamford, Conn., assignor to Pitney-Bowes, Inc., Stamford, Conn., a corporation of Delaware Application November 4, 1952, Serial No. 318,632

5 Claims. (Cl. 265—68)

This invention relates to weighing scales and particularly to scales of the platform type provided with a drum indicator, and has for its object the improvement in adjustability for accurate reading and extending the period of accurate reading operation between adjustments and readjustments as well as improving the convenience of the scale both from the standpoint of adjustment and during normal use.

A feature of the present invention is the provision of an adjustable check link post for correcting any difference in readings due to the platform positions of the article weighed, and the provision of convenient means for accurately effecting such adjustment and firmly securing it once made.

Another feature of the invention is the provision of ball bearings in place of knife edges at all rocking points in order to distribute the load and reduce wear on the parts, thus resulting in more prolonged periods of accurate operation between readjustments and repairs.

Another feature of the invention is the provision of improved toothed mechanism for driving the indicator drum with accurately meshing teeth in all positions and under all conditions of stress, in addition to an improved and simplified shock absorbing structure for the drum drive.

Still another feature of the invention is the provision of improved means for setting, guiding and clamping the adjustable spring perch for making zero settings on the drum.

A further feature of the invention resides in the particular configuration of the weighing arm and arrangement of the weighing springs which provides for an economical construction and, at the same time, permits the use of an undivided drum periphery and a drum of large diameter which approaches as closely as possible the upper surface of the machine for easy reading.

With the above and other objects in view, which will appear as the description proceeds, the invention resides in the combination and arrangement of parts and in the details of construction hereinafter described and claimed, it being understood that various changes in the precise embodiment of the invention herein disclosed may be made within the scope of what is claimed without departing from the spirit of the invention.

A preferred embodiment of the invention is illustrated in the accompanying drawings, wherein:

Fig. 3 is a detail section taken substantially on line 3—3 of Fig. 2;

Fig. 4 is a detail section taken substantially on line 4—4 of Fig. 3;

Fig. 5 is a detail section to a larger scale taken substantially on line 5—5 of Fig. 3;

Fig. 6 is a detail elevation to a larger scale of the upper part of the platform support looking toward the left in Fig. 1 with the check link and bearing being shown in section and the webs broken away to show the ends of the bearing shaft.

Figure 2:
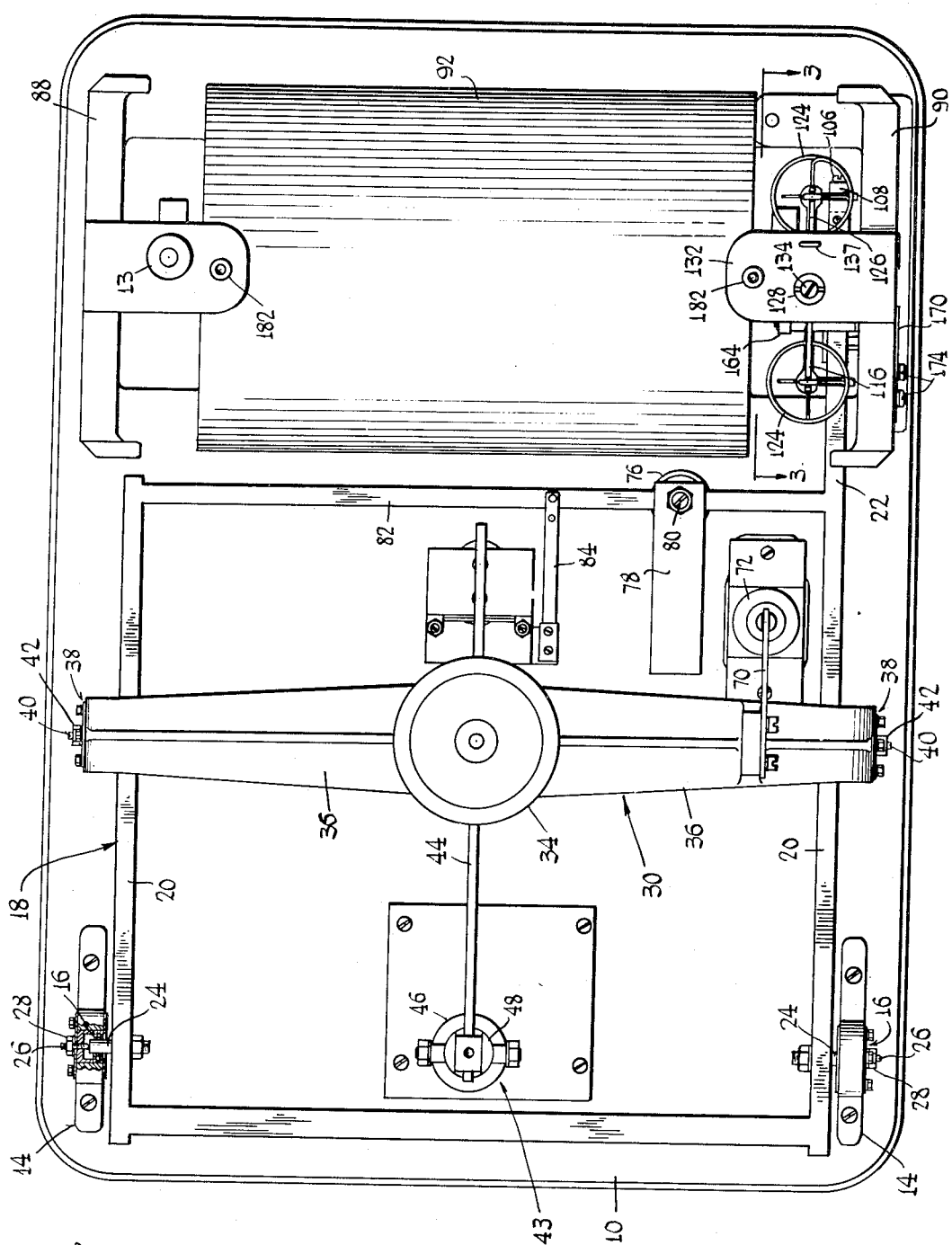
Fig. 2 is a top plan of the device of Fig. 1 with the housing removed, with the lamp omitted and with one of the weighing beam bearings shown in partial section.

With reference to the accompanying drawings, the weighing scale of the present invention includes a base casting 10 provided with adjustable feet 12 for leveling the same, a bubble level being provided on the frame at a suitable location, e. g. the level 13, Fig. 2, to ascertain the correct level position. At one end of the casting and at opposite sides thereof are affixed the mounting members 14 each of which carries a ball bearing assembly in the form of a ball bearing unit 16. There is provided a weighing beam or arm 18 in the form of an open rectangular frame 20 having an integral spring contacting and register driving nose 22 which consists of an extension of the member forming one side of the rectangle. The weighing beam 18 at the end opposite to the extension 22 carries a pair of oppositely directed studs 24 each of which is received in one of the ball bearing units 16. Centering screws 26 are threaded into each bearing assembly and engage the ends of studs 24 to keep the weighing beam in its proper centered position, and are locked in adjusted position by suitable lock nuts 28. The ball bearing units 16, it will be noted, not only provide for distribution of load and wear at the critical fulcrum points, but also hold the beam rigidly in place against any possibility of displacement of the pivots due to eccentric loading of the scale platform.

At points on opposite sides of the rectangular portion 20 of the arm 18 and about midway along its length is another pair of oppositely extending studs (not shown) similar to studs 24. Upon these studs is rockingly supported the yoke member 30 which carries at its upper end the platform 32 for receiving articles to be weighed. The yoke member includes a central stem 34 from which depend a pair of arms 36, each of which carries at its lower extremity a ball bearing unit 38 for receiving the corresponding weighing lever stud and supporting the yoke rockingly thereon. Each bearing unit 38 also includes a centering screw 40 and lock nut 42 for maintaining the central position of the yoke 30 on the arm 18.

Figure 1:
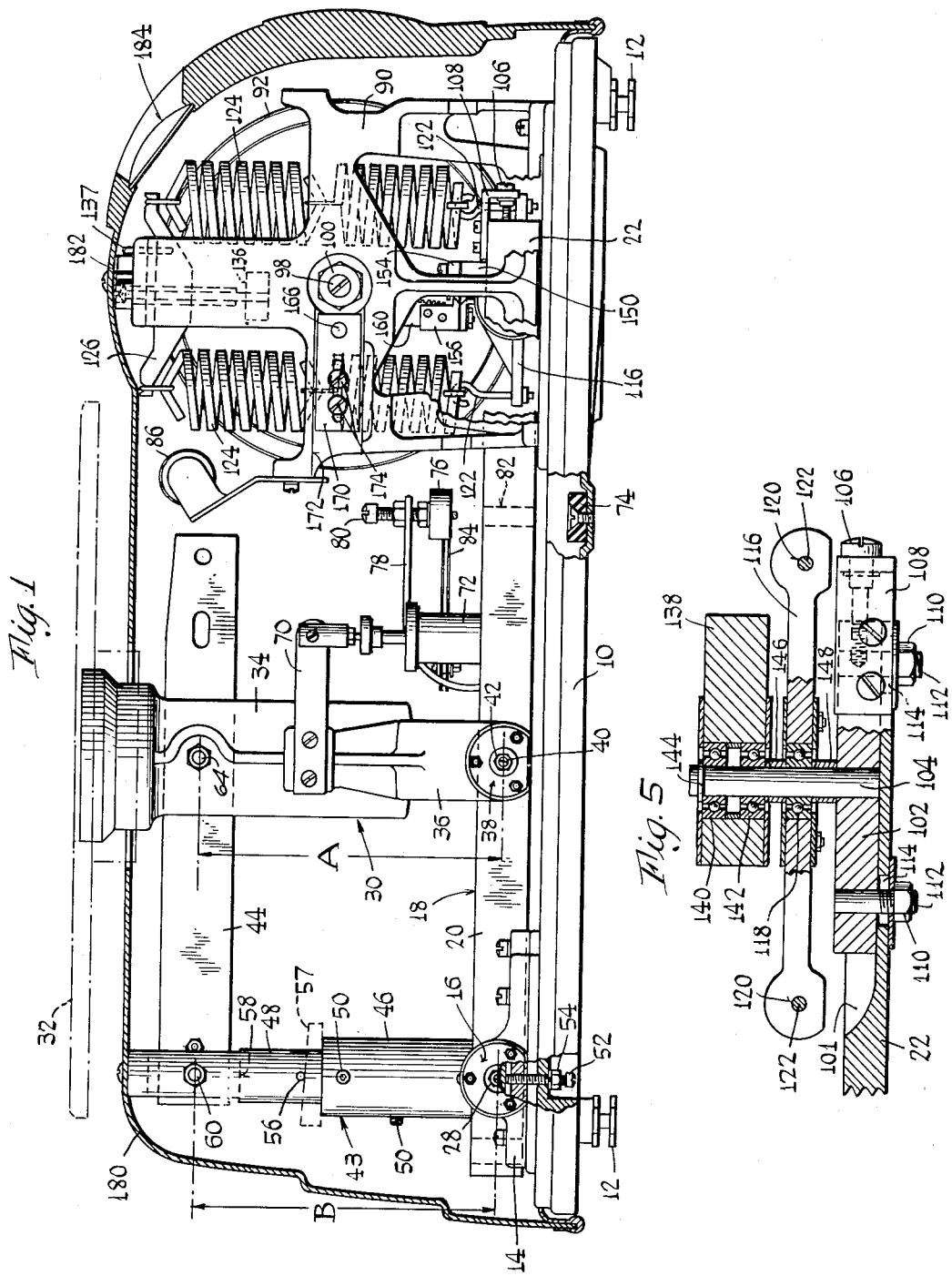
Fig. 1 is a side elevation of the scale according to the present invention with the housing shown in section and parts broken away to show details.

The vertical disposition of the yoke 34 is maintained by means of a post or pillar 43 and a check link 44. The post 43 is of novel construction and includes a tube 46 secured at its lower end to the base casting 10. A cylinder 48 is slidable within the tube so as to adjust the height of the post and may be held in any desired adjusted position by means of set screws 50, by a stop screw 52 threaded into the base casting and locked by a nut 54, or by both. The screw 52 makes contact with the lower end of cylinder 48 and may also be used in setting the cylinder 48 to the proper height if desired, but this operation is more easily performed through the offices of a pin 56 which projects laterally from the cylinder above the top of the tube 46 in a position to receive between itself and the upper end of the tube a wedge 57 of very slight taper (indicated in broken lines in Fig. 1) which can be driven between the parts to obtain an accurate setting without the necessity for gaining access to the bottom of the device. The upper end of the cylinder 48 is slotted as indicated by reference character 58 to receive the end of the check link 44 and carries a transverse pin 60 which receives a ball bearing (not shown) carried by the end of the link 44. A similar connection, shown in detail in Fig. 6, is provided for connecting the link 4 with the stem 34. The latter is formed with a slot 62 across which extends a shaft 64. Centered on the shaft 64 between the walls of the slot 62 by means of spacers 66 is a ball bearing unit 68 which is carried by the link 44 to complete the parallelogram arrangement of the weighing scale.

It has been discovered that while the horizontal distances for the coplanar openings for pivots and bearings are easily controlled as to accurate spacing by drill jigs and the like, the vertical distance between the center of bearings 38 and the center of pin 64 is more difficult to accurately predetermine with ordinary fabrication procedures. It has further been discovered that a slight discrepancy between this length (designed as the length A in Fig. 1) and the vertical distance between the center of pin 60 and the center of bearings 16 or studs 24 (designated length B in Fig. 1) will cause improper functioning of the scale in that readings for the same weight will vary depending upon the position of the weight on the platform towards and away from the post 43. The ready adjustment in height provided for post 43 permits fabrication of the parts in a normal and economical manner without the danger of having the scale accuracy suffer as a result.

Extending from the yoke 30 is an arm 70 which is connected with and actuates the usual dashpot 72.

A lower rubber bumper 74 is mounted on the base 10 and an upper rubber bumper 76 is mounted above it on an arm 78 carried by the base 10. The bumper 76 is preferably adjustable in height by means of screw 80. The bumpers 74 and 76 serve to limit the motion of the weighing arm 18 by contacting the cross member 82 thereof, and also serve to reduce the shock of arresting the weighing beam when its swinging motion is too rapid.

An electric switch 84 is provided and suitably connected to the lamp 86 and to a source of electrical energy for the purpose of illuminating the drum whenever the scale is in use and is positioned for operation by the cross member 82 of the weighing arm.

The forward end of the base 10 carries a pair of spaced uprights 88 and 90 which cooperate therewith to form the frame of the scale and between which is rotatably mounted the indicating drum 92 of the scale. As can be seen in Fig. 4, the drum 92 is mounted on an axial shaft 94 which mounts at one end the outer race of a ball bearing unit 96. The inner race of the unit is mounted on a stud 98 which is threadedly supported in the upright 90 for properly setting the axial position of the bearing 96 to provide free running and minimum side load friction. When the proper setting for stud 98 is determined, it may be secured by lock nut 100. It will be understood that a similar rotary mounting arrangement is provided on the upright 88 for the other end of shaft 94.

The extension 22 of the weighing beam 18 lies alongside the upright 90 and between said upright and the adjacent end of the drum 92. As is usual in platform scales, the end of the beam, which is remote from the base pivot, provides for (1) connection of the counterbalance spring and (2) driving the drum, and such is also the case in the construction according to the present invention. As seen in Fig. 5, the end 22 of the weighing beam 18 is provided with a recess 101 and carries therein a longitudinally slidable block 102 on which is mounted the horizontally and transversely extending stud 104. The position of the block 102 can be adjusted to vary slightly the distance between the axis of stud 104 and the axis of the base pivot studs 24. This adjustment is accomplished by means of positioning screw 106 threadedly engaged in the end of block 102 and rotatably carried by a bracket 108 rigidly mounted on the end of extension 22 of the weighing beam 18. The position of the block 102 and its stud 104, once properly adjusted, as hereinafter described, can be securely maintained by tightening the nuts 110 on clamp screws 112 which pass through slots 114 in the extension 22.

A spring connector bar 116 is rockably mounted on the stud 104 by means of a ball bearing unit 118, and provides means in the form of openings 120, one at each end, for receiving hooks 122 and making connection with the bottom ends of a pair of counterbalance spring assemblies 124, and for equalizing their effect on the end of the weighing beam 18. The spring assemblies 124 are isoelastic springs of special manufacture for extreme accuracy, are of a known type and form no part of the present invention except as their arrangement with two sets of springs operating against the weighing beam instead of one, reduces the diameter of spring required for a given maximum weight handled by the scale so as to permit holding the space between the upright 90 and the end of drum 92 to a minimum.

The upper end of each spring is connected with the adjacent end of an adjustable spring perch 126 which is mounted by its central threaded opening on a supporting and adjusting screw 128 as best seen in Figs. 3 and 4. The screw 128 is freely rotatable in an opening 130 in a horizontal flange 132 extending inwardly from the upper end of the upright 90, and may be rotated in one direction or the other in order to determine the rest position of the weighing beam extension 22 and thus bring the scale to an accurate zero position. When such adjustment is completed the screw 128 may be securely clamped against the upper surface of the flange 132 to prevent further rotation by means of a headed clamp screw 134 which passes through a central opening in screw 128 and is threaded into a boss 136 extending inwardly from the upright 90. To prevent swinging of the perch 126 about the axis of screw 128 at any time, and still permit vertical adjustment thereof, there is provided an inverted U-shaped element 137 whose legs extend downwardly through suitable openings in the flange 132 and guidingly engage the opposite faces of the perch 126.

Turning again to Fig. 5, it can be seen that the stud 104 also carries the rack support member 138 which is supported on the stud by means of two ball bearing units 140 and 142. The rack support is retained on the stud by a fastener such as snap ring 144 and all of the parts supported by the stud are held in properly spaced position by spacers 146, 148. The two ball bearing units 140 and 142 are on an axis parallel to the axis of the drum shaft 94 and thus keep the rack support 138 from cocking to preserve alignment of the rack teeth parallel to its pinion axis as will subsequently appear.

The upper portion of the support member 138 is provided with an upwardly extending boss 150 to which is secured one end of a relatively stiff leaf spring 152, the same being held in place by a cap member 154 screwed to the boss 150. The other end of the leaf spring is held between a block 156 and a clamp member 158 screwed thereto. The block 156 carries a curved rack 160 which extends upwardly between the springs 124 and meshes with a pinion 162 integrally secured to the drum shaft 94 for driving the same to give a weight indication as the extension 22 of the weighing beam 18 is raised or lowered. It will be seen that the leaf spring is stiff enough normally to drive the rack as if it were an integral extension of the support member 138. It is still resilient enough to give somewhat under extreme conditions however, and provides a slight shock absorbing action to give an instant of time for accelerating the drum when a heavy load is suddenly thrown onto or removed from the platform, or for decelerating the drum when the weighing beam member 82 strikes the bumper 74 or 76. For the most part, however, the rack 160 is intended to act as if it were an extension of the beam 18, and to this end the block 156 and clamp member 158 are provided respectively with stop surfaces 156a and 158a designed to engage other stop surfaces after very minute deflection of the spring 152 in either direction. The stop surfaces which they engage are conveniently arranged as the lower surface of a stop flange 154a on the cap 154, and the upper surface 138a of the rack support 138.

In order to provide for smooth operation with a minimum of shock and friction it would be desirable if the rack 160 could be accurately meshed with its pinion to the prescribed degree, and this meshing relationship be maintained unchanged in all conditions of operation. The arrangement of the current rack and spring supporting means therefor, also the counter-weight effect of the overhanging portion 138a of the support 138 makes possible this condition and is a feature of this invention. The backing up of the rack 160 with a guide roller 164 further insures the proper relationship between the teeth of the rack and pinion. In order that the roller 164 may be accurately set, particularly when installed, it is mounted on a stud 166 which extends through a slot 168 in the upright 90. The stud 166 is carried by a slide block 170 slidable in a recess 172 in the outer face of the upright. Suitable clamping screws 174 are provided for firmly securing the block 170 in position when the adjustment is complete.

Regarding the adjustment provided by screw 106 previously mentioned, it will be seen that the primary purpose of this adjustment is to change the mechanical advantage which the counterbalance springs 124 have in relation to the resistance provided by the load on the platform 32. The effect of this change, insofar as scale operation is concerned, is to increase or decrease the amount of beam travel for a given weight, and to bring the beam travel exactly into line with the lengths of divisions employed on the indicating drum 92. The adjustment is employed, after the zero setting by screw 128 is complete, usually by placing on platform 32 an accurate test weight equivalent to the maximum scale reading of the drum 92. The screw 106 is then adjusted slightly until the maximum reading on the drum stands exactly opposite the index mark. It will be noted that such adjustment of screw 106 not only changes the point at which spring pressure is applied to the beam but also tends to alter the contact point of rack 160 and pinion 162. However, a very slight change in position using adjusting screw 106 effects rather marked changes in the drum reading. As a result the amount moved by the lower end of the rack is so small that even at the closest operating spacing of the beam extension 22 to the axis of the pinion 162 (as seen in Fig. 3), the angle subtended at the point of rack and piston contact by the adjusting distance moved along arm 22 is so minute as to be altogether negligible—so minute in fact that no perceptible further adjustment of roller 164 is required, when the adjustment of screw 106 is made, to provide for proper meshing clearance of the rack and gear.

The scale mechanism is housed within a casing 180 (Fig. 1) which is fastened to the mounting bosses 182 on the upper surfaces of uprights 88 and 90 and protects the parts from dust and damage. An inspection window at location 184 at the front of the casing is provided for reading the drum when a weighing is in progress.

Having described the invention, what is claimed is:

1. In a weighing scale, a base; a weighing beam fulcrumed at one end on the base, said beam having the configuration of an open rectangular framework and including a nose consisting substantially of a straight line extension of one only of the sides of the open framework extending adjacent one side of the base; a rotatable indicator drum having a shaft supporting the same positioned parallel to the beam fulcrum and including a pinion on the shaft; an upright mounted on the base adjacent said nose and rotatably supporting one end of said shaft, said nose lying between said upright and the adjacent end of said drum; and a spring assembly providing the entire external counterbalancing effort for said weighing beam acting on said nose, said spring assembly comprising a pair of springs supported by said upright and positioned between the latter and the adjacent end of said drum, one at either side of said shaft, said pinion being between the adjacent drum end and the upright; a rack connected with the nose extension of said beam, extending between said springs and into mesh with said pinion, said nose including a connector element slidable thereon towards and away from said fulcrum; and means for fixing the position of the connector elements after sliding adjustment thereof; said spring assembly and said rack both being connected to said connector element as their sole connection with said beam.

2. A weighing scale comprising a base; a spring assembly; an indicator drive; a weighing beam rockingly fulcrumed on the base at one end and connected at its other end with said spring assembly and said indicator drive; a platform yoke rockingly connected with said weighing beam midway between its ends; a pillar on the base; a check link rockingly fulcrumed at one end to said pillar and at the other to said yoke, said pillar comprising a pair of telescoping sections; a slidable wedge having engagement with a portion of each pillar section to effect lengthening or shortening of the distance between the beam fulcrum and the check link fulcrum; and means to hold said telescoping sections in any adjusted position of pillar length.

3. A weighing scale comprising a base; a spring assembly; an indicator drive; a weighing beam rockingly fulcrumed on the base at one end and connected at its other end with said spring assembly and said indicator drive; a platform yoke rockingly connected with said weighing beam midway between its ends; a pillar on the base; and a check link rockingly connected at one end to said yoke, said pillar comprising a tube secured at one end to the base and a cylinder slidable in said tube and projecting from the upper end thereof and connected to the other end of said check link, a slidable wedge having engagement with a portion of the tube and cylinder to effect lengthening or shortening of the distance between the beam fulcrum and check link connection with the cylinder, and an adjusting screw threadedly mounted in said base and projecting into said tube into contact with the bottom of said cylinder.

4. A weighing scale comprising a base; a spring assembly; an indicator drive; a weighing beam rockingly fulcrumed on the base at one end and connected at its other end with said spring assembly and said indicator drive; a platform yoke rockingly connected with said weighing beam midway between its ends; a pillar on the base; a check link rockingly connected at one end to said yoke, said pillar comprising a tube secured at one end to the base and a cylinder slidable in said tube and projecting from the upper end thereof and connected to the other end of said check link; a member mounted on said cylinder above the end of said tube and providing a substantially horizontal surface opposing the end of the tube and providing therewith means to receive a wedge for raising the tube in the cylinder and adjusting the height thereof; and means including set screws threaded in said tube and impinging upon said cylinder for locking the cylinder in adjusted position.

5. In a weighing scale, a frame including a base; a weighing beam fulcrumed at one end on the base; a spring assembly connected to and acting on the other end of the beam; a hollow adjusting screw rotatable on said frame; an adjustable spring perch connected to the spring having threaded opening receiving said adjusting screw for carrying and adjusting the perch, and a headed clamp screw passing through said adjusting screw and threaded into a portion of said frame for clamping said adjusting screw in adjusted position.

References Cited in the file of this patent

UNITED STATES PATENTS

| | | |
|---|---|---|
| 746,418 | Verplast | Dec. 8, 1903 |
| 878,915 | Verplast | Feb. 11, 1908 |
| 1,012,640 | Hopkinson | Dec. 26, 1911 |

(Other references on following page)

UNITED STATES PATENTS

| | | |
|---|---|---|
| 1,031,699 | Emanuel | July 9, 1912 |
| 1,289,885 | Osborn | Dec. 31, 1918 |
| 1,352,097 | Sonander | Sept. 7, 1920 |
| 1,650,913 | Strachan | Nov. 29, 1927 |
| 1,656,267 | Craig | Jan. 17, 1928 |
| 1,668,029 | Strachan | May 1, 1928 |
| 1,827,499 | Weidler | Oct. 13, 1931 |
| 1,875,809 | Hallwood | Sept. 6, 1932 |
| 1,896,258 | Strachan | Feb. 7, 1933 |
| 2,026,290 | Teraoka | Dec. 31, 1935 |
| 2,047,311 | Conners | July 14, 1936 |
| 2,073,912 | Walker | Mar. 16, 1937 |
| 2,255,110 | Garbell | Sept. 9, 1941 |
| 2,311,264 | Stimpson | Feb. 16, 1943 |
| 2,622,869 | Van Duyn | Dec. 23, 1952 |